G. A. ANDERSON.
UNIVERSAL COUPLING.
APPLICATION FILED NOV. 22, 1907.
901,864.
Patented Oct. 20, 1908.
2 SHEETS—SHEET 1.
FIG_1_
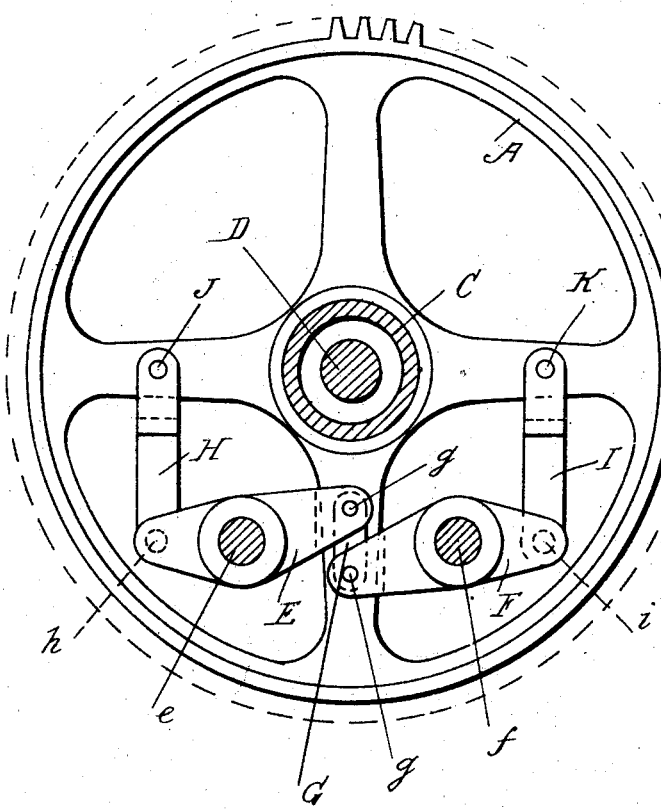
FIG_2_
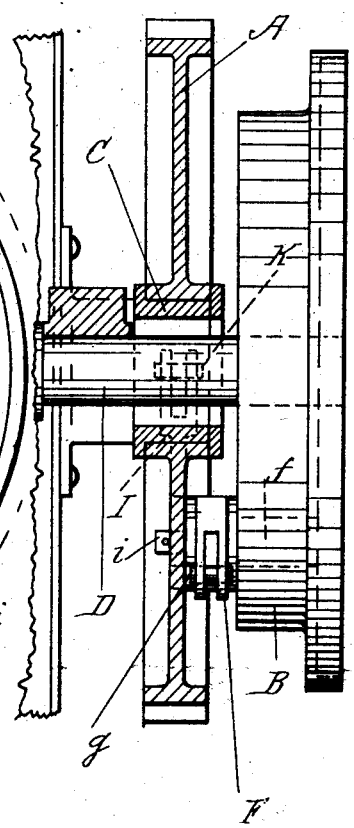
WITNESSES:
Walter Allen
L. B. Middleton
INVENTOR
Gustaf Arvid Anderson.
BY
Herbert W. Jenner.
Attorney

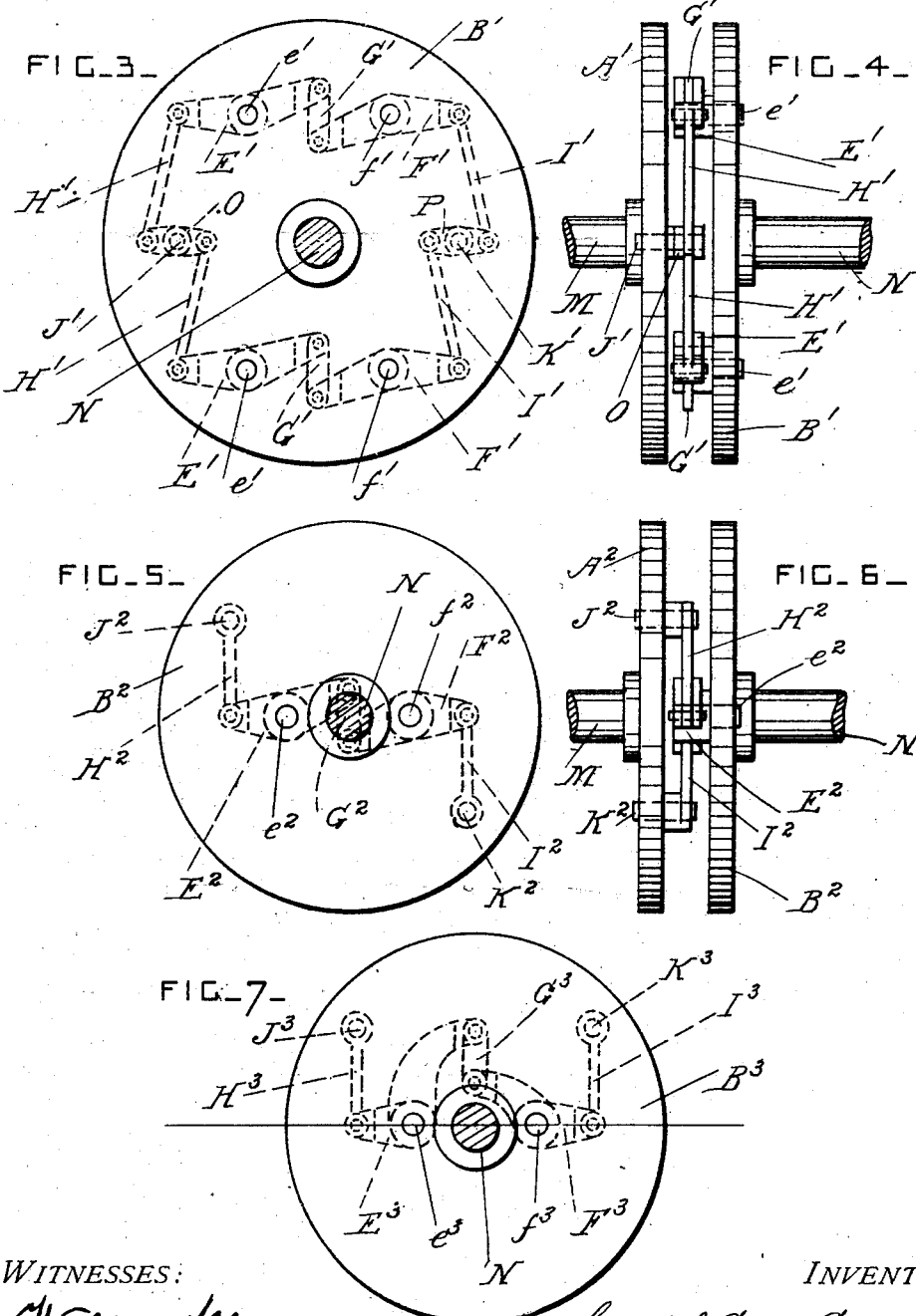

UNITED STATES PATENT OFFICE.

GUSTAF ARVID ANDERSON, OF WAYNESBORO, PENNSYLVANIA, ASSIGNOR TO THE GEISER MANUFACTURING COMPANY, OF WAYNESBORO, PENNSYLVANIA.

UNIVERSAL COUPLING.

No. 901,864.  Specification of Letters Patent.  Patented Oct. 20, 1908.

Application filed November 22, 1907. Serial No. 403,354.

*To all whom it may concern:*

Be it known that I, GUSTAF ARVID ANDERSON, a citizen of the United States, residing at Waynesboro, in the county of Franklin and State of Pennsylvania, have invented certain new and useful Improvements in Universal Couplings; and I do hereby declare the following to be a full, clear, and exact description of the invention, such as will enable others skilled in the art to which it appertains to make and use the same.

This invention relates to universal couplings or joints used in connection with the driving gear of traction engines and for other purposes; and it consists in the novel construction and combination of the parts hereinafter fully described and claimed.

In the drawings, Figure 1 is a front view partly in section of one form of the coupling applied to the gearing of a traction engine. Fig. 2 is a side view of the same, partly in section. Fig. 3 is a front view showing a modification of the coupling shown in Fig. 1; and Fig. 4 is a side view of the same. Fig. 5 is a front view showing a second modification of the coupling shown in Fig. 1; and Fig. 6 is a side view of the same. Fig. 7 is a front view of a coupling similar to that shown in Fig. 5 but arranged in a modified way.

A is one coupling member, and B is the other coupling member. The coupling member A is preferably the master gear wheel of a traction engine, and it drives the coupling member B which is preferably a portion of the case or frame of a compensating gear of approved construction. The coupling member A is journaled on a bearing C, and the coupling member B is supported by an axle D. As the traction engine travels along a road the axes of the two members A and B are subject to constant displacement with respect to each other, principally in a vertical plane, the traction engine being mounted on springs in any approved manner. The parts A and B are connected and constructed as members of a universal coupling to permit of their relative displacement while transmitting power from one to the other.

E and F are two levers which are fulcrumed upon pins $e$ and $f$ which project from the coupling member B. The adjacent ends of these levers are connected together by means of a link G and pins $g$. The opposite ends of the levers E and F are pivoted respectively to the ends of links H and I by pins $h$ and $i$, and the links H and I are pivoted at their other ends to pins J and K respectively which project from the coupling member A. The levers E and F are arranged between the links H and I with their adjacent end portions overlapping each other, and the connecting link G is normally arranged substantially radial of the axle D and bearing C. The end portions of the levers E and F are preferably forked for the reception of the said link G, and the various pivot and fulcrum pins are fitted loosely in their holes so that one coupling member may move or tilt in all directions to a slight extent with respect to the other coupling member, in addition to being free to move to a much greater extent in a vertical plane.

In the modification shown in Figs. 3 and 4, the coupling members A' and B' are shown secured to two separate shafts M and N. Two pairs of levers E' and F' are pivoted upon pins $e'$ and $f'$ which project from the coupling member B', and the adjacent ends of each pair of levers are pivotally connected together by links G'. The coupling member A' is provided with pivot pins J' and K', but instead of the links H' and I' being pivoted to these pins, they are pivoted to the opposite ends of two equalizing levers O and P which are pivoted on the said pins J' and K'. The other ends of the links H' and I' are pivoted to the outer ends of the levers E' and F'. In this manner the driving strain is distributed more equally around the coupling members, and the object of the equalizing levers is to equalize the strains in the various links and levers as well as to distribute them around the coupling members. The links H' and I' are operatively connected with the coupling-member A' at one end, and they perform the same function as the links H and I which are operatively connected with the coupling-member A.

In the modification shown in Figs. 5 and 6, a simple form of coupling is shown in which the coupling members $A^2$ and $B^2$ are provided with a single pair of levers $E^2$ and $F^2$ which are fulcrumed on pins $e^2$ and $f^2$ which project from the coupling member $B^2$ upon opposite sides of its axis. The adjacent ends of these levers are pivotally connected together by a link $G^2$, and their opposite ends are connected by links $H^2$ and $I^2$ to pivot pins $J^2$ and $K^2$ which project from the coupling member A², and which are arranged near its periphery. In this form of coupling, the link G² is arranged between the ends of the two shafts at the axes of the two coupling members.

In the modification shown in Fig. 7, the arrangement of the levers is similar to that shown in Fig. 5, but the levers E³ and F³ are provided with curved portions at their adjacent ends, so that the connecting link G³ is arranged out of line with the ends of the shafts on which the two coupling members B³ are mounted, it being frequently desirable not to have any obstruction at this point. The two links H³ and I³ are pivoted to the outer ends of the levers and to pins J³ and K³. These pins are similar to those shown in Fig. 5, but they are arranged to one side of a center line drawn through the pivot pins $e^3$ and $f^3$ instead of being arranged upon opposite sides of this line.

What I claim is:

1. In a universal coupling, the combination, with two coupling-members, of a pair of links operatively connected at one end with one of the said coupling-members, a pair of levers pivoted to the other of the said coupling-members and having their outer ends pivoted to the other ends of the said links, said levers being arranged between the said links with their adjacent end portions overlapping each other, and a link pivoted to the adjacent ends of the said levers and normally arranged substantially radial of the said coupling-members.

2. In a universal coupling, the combination, with two coupling members, of two pairs of levers pivoted to one of the said coupling members, two equalizing levers pivoted to the other coupling member and arranged between the said pairs of levers, means for connecting together the adjacent ends of the levers forming each pair of levers, links connecting the outer ends of one pair of levers with the outer ends of the said equalizing levers, and links connecting the outer ends of the other pair of levers with the inner ends of the said equalizing levers.

In testimony whereof I have affixed my signature in the presence of two witnesses.

GUSTAF ARVID ANDERSON.

Witnesses:
DANIEL S. BEARD,
JOHN STORER PRICE.